United States Patent [19]
Maeda et al.

[11] Patent Number: 5,572,493
[45] Date of Patent: Nov. 5, 1996

[54] OPTICAL DISK INFORMATION RECORDING APPARATUS AND REPRODUCING APPARATUS HAVING A PLURALITY OF READ OR WRITE BEAMS

[75] Inventors: Takanori Maeda; Kiyoshi Tateishi; Hajime Koyanagi, all of Tsurugashima, Japan

[73] Assignee: Pioneer Electronic Corporation, Tokyo, Japan

[21] Appl. No.: 467,024

[22] Filed: Jun. 6, 1995

Related U.S. Application Data

[62] Division of Ser. No. 162,842, Dec. 7, 1993, Pat. No. 5,457,670.

[30] Foreign Application Priority Data

Dec. 9, 1992 [JP] Japan .................................. 4-329388
Nov. 16, 1993 [JP] Japan .................................. 5-286778

[51] Int. Cl.[6] .................................................. G11B 7/085
[52] U.S. Cl. ............................................ 369/44.28; 369/54
[58] Field of Search ........................... 369/44.26, 44.29, 369/44.32, 44.37, 32, 116, 54, 58

[56] References Cited

U.S. PATENT DOCUMENTS

| | | | |
|---|---|---|---|
| 4,759,007 | 7/1988 | Eberly | 369/58 |
| 4,796,247 | 1/1989 | Vogelsang | 369/44.28 |
| 5,054,013 | 10/1991 | Kawamura | 369/44.28 |
| 5,208,792 | 5/1993 | Imanaka | 369/44.38 |

Primary Examiner—W. R. Young
Attorney, Agent, or Firm—Sughrue, Mion, Zinn, Macpeak & Seas

[57] ABSTRACT

Optical disk information recording apparatus and reproducing apparatus are designed to efficiently improve the transfer rate in information recording and reproduction, and have compatibility with the existing recording apparatus and reproducing apparatus using a single light beam while keeping the disk form with a single spiral track structure. Beam spots are simultaneously irradiated on a plurality of different radial positions on a disk at a pitch of a predetermined number of tracks to independently record various information signals, and the optical head is allowed to jump over a predetermined number of tracks every time the disk makes a predetermined number of turns. Another feature lies in that beam spots are simultaneously irradiated on a plurality of different radial positions on a disk at a pitch of a predetermined number of tracks to independently record various information signals, and a jump over a predetermined number of tracks is made in a predetermined interval corresponding to a period from the point where each light beam has made a track jump during which period signals are stably reproducible or recordable.

6 Claims, 16 Drawing Sheets

PRIOR ART FIG. 1
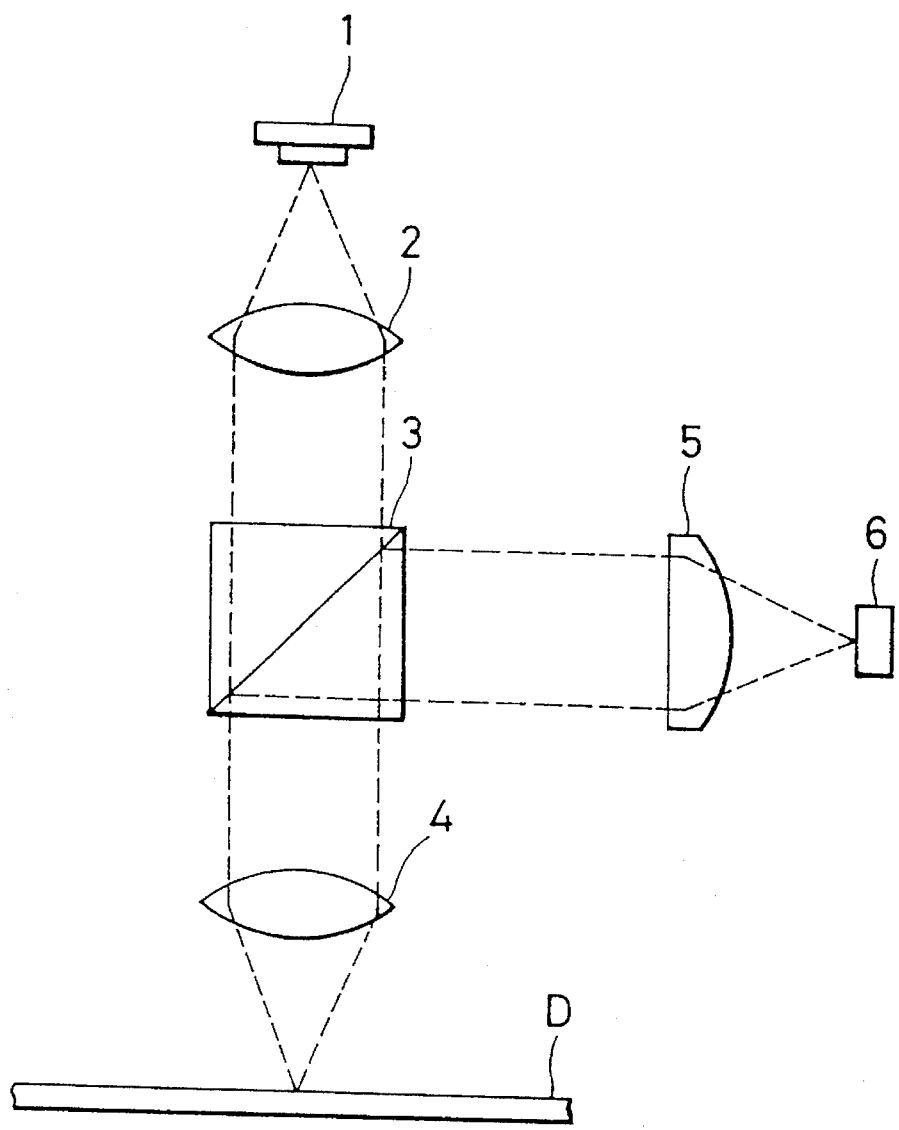

PRIOR ART    FIG. 2A
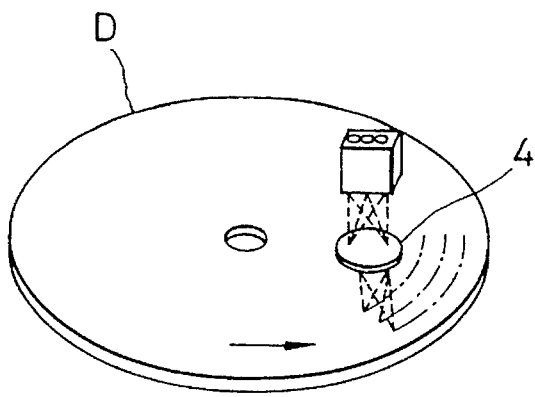
PRIOR ART    FIG. 2B
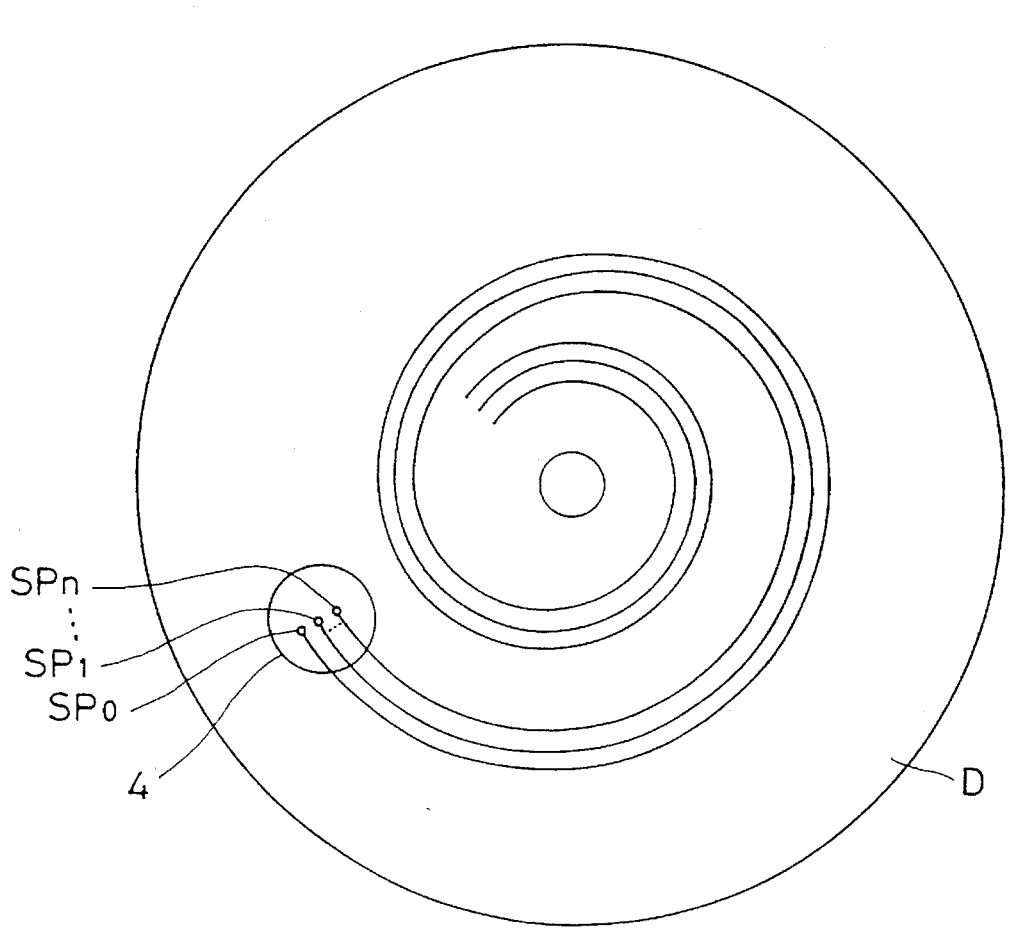

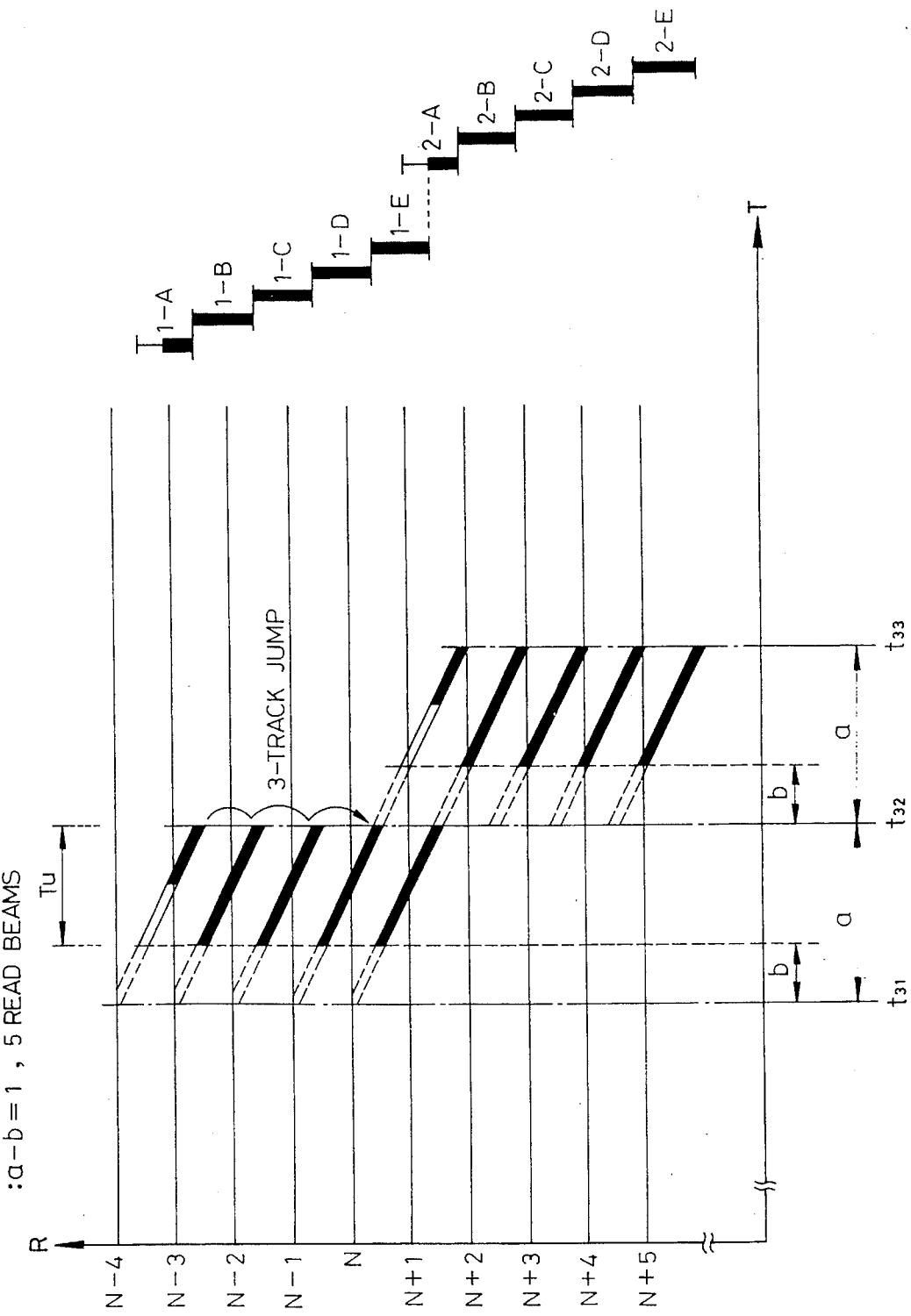

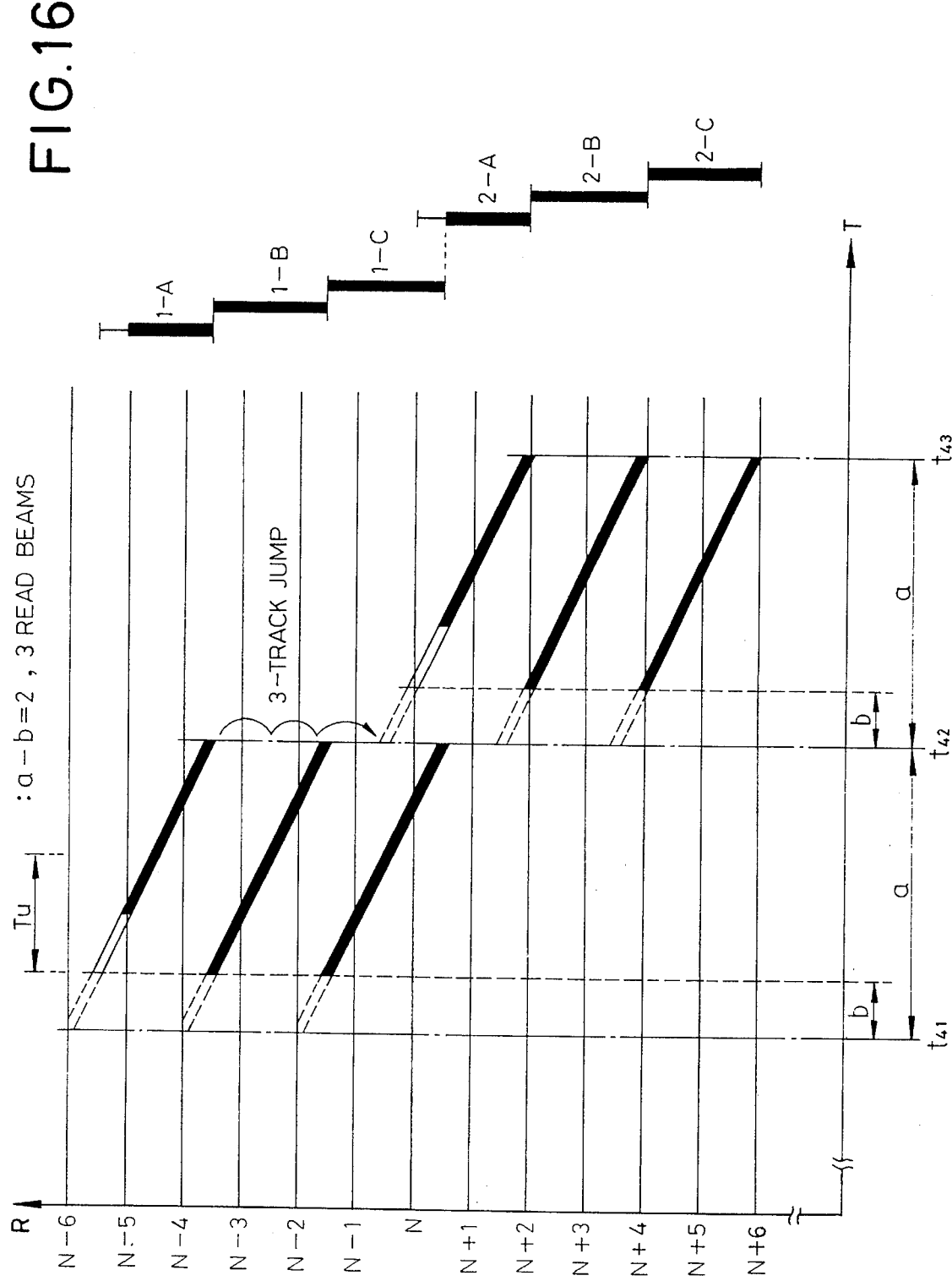

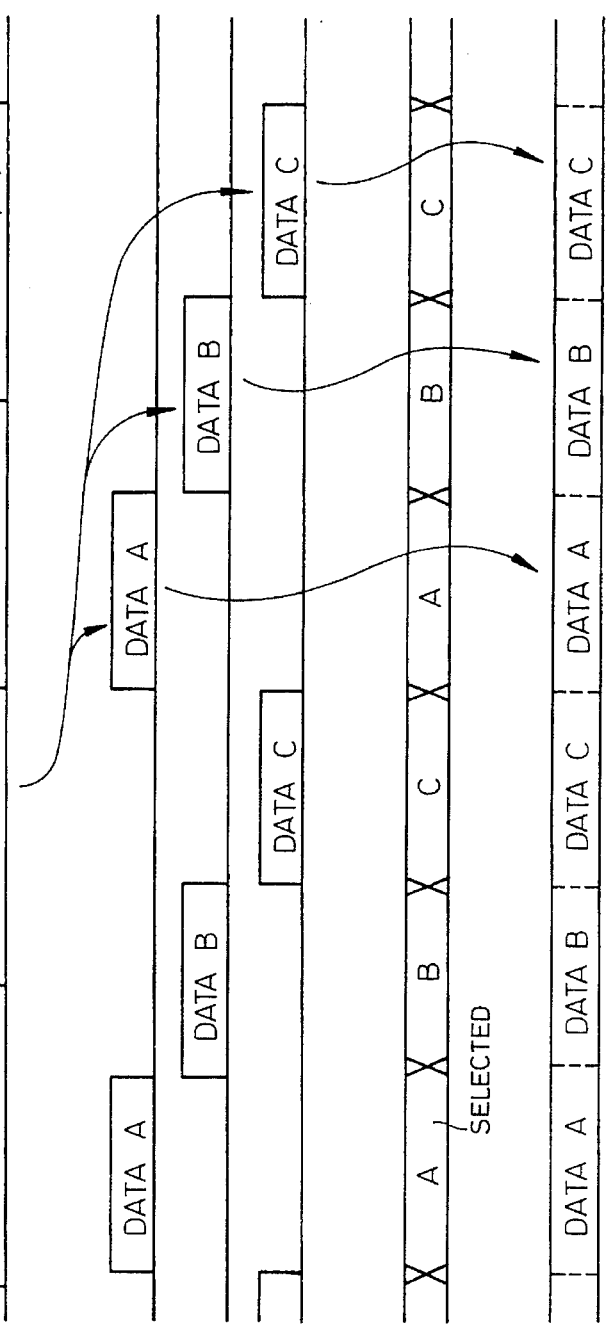

OPTICAL DISK INFORMATION RECORDING APPARATUS AND REPRODUCING APPARATUS HAVING A PLURALITY OF READ OR WRITE BEAMS

This is a divisional of application Ser. No. 08/162,842 filed Dec. 7, 1993, now U.S. Pat. No. 5,457,670.

BACKGROUND OF THE INVENTION

1. Field of the Invention

The present invention relates to a recording apparatus for recording various kinds of information signals, such as video signals, speech signals and control signals, on an optical disk as an optical recording medium, and a reproducing apparatus for reading and reproducing recorded signals from such an information recording medium. More particularly, this invention relates to an optical disk information recording apparatus and reproducing apparatus, which use an optical head defining recording points or reading points on a recording medium with a plurality of light beams to record or read information signals on or therefrom.

2. Description of Background Information

Recently, it is contemplated to record and reproduce a high-definition television signal on and from an optical disk in the form of a digital signal. One of the features of this signal is the amount of signals to be transferable per unit time, which is 50 Mbps (bps represents the amount of information bits (bits) transferred per second). Since the amount is very large, about 40 times the transfer amount of a currently used compact disk (1.2 Mbps), a relatively high information transfer rate is required.

There is a recording apparatus for recording information on an optical disk of a phase change type as a conventional optical disk information recording form, as shown in FIG. 1.

In FIG. 1, light emitted from a laser diode 1 becomes parallel light by a collimator lens 2. The parallel light passes a beam splitter 3, and is focused on a disk D by an objective lens 4, forming pits on the recording surface of the disk D. The reflected light from the disk D passes the objective lens 4 to become parallel light, which is reflected by the beam splitter 3 to enter a cylindrical lens 5. The light, which has caused astigmatism by the cylindrical lens 5, enters a photodetector 6, yielding a tracking signal and a focus signal.

With this conventional structure, information is recorded in a single spiral form starting from the inner track using a single write beam, and recorded information is reproduced on the single spiral track using a single read beam. Although it is typical to use three beams for control to trace a single track, only one light beam is used for information reproduction.

In recording information in a single spiral form with a single beam, the number of rotations of the disk D should be increased and the information density should also be improved in order to increase the transfer rate. To realize this method, it is necessary to increase the output of the laser diode 1 or increase the recording sensitivity of the disk D as a recording medium. Therefore, there inevitably is a limit to the improvement of the recording speed.

More specifically, increasing the number of rotations of a disk is limited to about five times the current level due to the restriction that the objective lens for reading recorded information from the disk should accurately follow up the surface vibration of the disk, and improving the information density by shortening the wavelength to be read is limited to as high as two times the current density even with the use of blue laser light. That is, those two schemes, even when combined, will not improve (increase) the transfer rate more than ten times the current level.

As comparative methods, a scheme is described in Japanese Patent Kokai No. S 59-65948, and a three beam high vision disk system is proposed in the Japanese Patent Kokai No. H 2-185728 or in Institute of Television Annual Convention 1993 (20-1), ITEC '93: ITE Annual Convention, "Development of High Vision Video Disk System by Three Beam Reading System". Those methods simultaneously irradiate three laser beam spots SP1, SP2 and SP3 on three adjacent tracks on a disk to record or read information on or from the three tracks at the same time as shown in FIGS. 2A and 2B, thereby improving the transfer rate.

If those methods are used, however, a disk designed for the methods has triple spiral tracks. In other words, rows of spiral recording pits which are equal in number to the beam spots are formed. The disk having information recorded in that manner therefore requires an optical head, which generates the same number of light beam spots also for reproduction, and its information cannot be reproduced by an existing player which uses only one beam.

OBJECT AND SUMMARY OF THE INVENTION

It is therefore an object of the present invention to provide an optical disk information recording apparatus and reproducing apparatus, which are designed to efficiently improve the transfer rate in information recording and reproduction, and will have compatibility with the existing recording apparatus and reproducing apparatus using a single light beam while keeping the disk form with a single spiral track structure.

According to one aspect of this invention, there is provided an optical disk information recording apparatus for recording an information signal in a spiral form on a disk while rotating the disk, comprising a memory for storing a plurality of information signals to be recorded; an optical head for emitting a plurality of light beams having intensities changeable in accordance with each of the information signals and focusing and irradiating the light beams as light spots at a plurality of different radial positions on the disk at a pitch of a predetermined number of tracks; moving means for moving the light spots in a radial direction of the disk; position detecting means for detecting positions of the light spots on the disk; and jump control means for controlling the moving means in such a way that the light spots make a predetermined number of track jumps for a predetermined number of rotations of the disk in accordance with a detection output of the position detecting means.

According to another aspect of this invention, there is provided an optical disk information recording apparatus for recording an information signal in a spiral form on a disk while rotating the disk, comprising recorded-information outputting means for outputting a plurality of information signals to be recorded in recording mode; an optical head for emitting a plurality of light beams having levels respectively corresponding to the information signals output from the recorded-information outputting means and irradiating the light beams as light spots at a plurality of different radial positions on the disk; moving means for moving the light spots in a radial direction of the disk in response to a track jump signal; position detecting means for detecting circumferential positions of the light spots on the disk; and recording control means for generating the track jump signal to the moving means and designating the recording mode to the recorded-information outputting means based on a detection output of the position detecting means, whereby the optical pick-up forms the light spots whose separation distance in the radial direction of the disk nearly equals an interval of a predetermined number n of tracks, and the recording control means sets a generation cycle a of the track jump signal and a blank period b from the start of an operation of the moving means in response to the track jump signal to the start of the recording mode, as $$a=b+n$$

where a and b are values with a time required for the light spots to travel one track taken as a unit.

According to a further aspect of this invention, there is provided an optical disk information reproducing apparatus for reproducing an information signal recorded in a spiral form on a disk while rotating the disk, comprising a pick-up for emitting a plurality of light beams and irradiating the light beams as light spots at a plurality of different radial positions on the disk; read-information obtaining means for obtaining, from the disk, read signals according to levels of the light spots in reproducing mode; moving means for moving the light spots in a radial direction of the disk in response to a track jump signal; position detecting means for detecting circumferential positions of the light spots on the disk; and reproducing control means for generating the track jump signal to the moving means and designating the reproducing mode to the read-information obtaining means based on a detection output of the position detecting means, whereby the optical pick-up forms the light spots whose separation distance in the radial direction of the disk nearly equals an interval of a predetermined number n of tracks, and the reproducing control means sets a generation cycle a of the track jump signal and a blank period b from the start of an operation of the moving means in response to the track jump signal to the start of the reproducing mode, as $$a=b+n$$

where a and b are values with a time required for the light spots to travel one track taken as a unit.

According to the optical disk recording apparatus of this invention, beam spots are simultaneously irradiated on a plurality of different radial positions on a disk at a pitch of a predetermined number of tracks to independently record various information signals, and the optical head is allowed to jump over a predetermined number of tracks every time the disk makes a predetermined number of turns.

According to the optical disk information recording and reproducing apparatus of this invention, beam spots are simultaneously irradiated on a plurality of different radial positions on a disk at a pitch of a predetermined number of tracks to independently record various information signals, and a jump over a predetermined number of tracks is made in a predetermined interval corresponding to a period from the point where each light beam has made a track jump during which period signals are stably reproducible or recordable.

BRIEF DESCRIPTION OF THE DRAWINGS

FIG. 1 is a block diagram showing one example of a conventional optical disk recording apparatus;

FIGS. 2A and 2B are diagrams showing another example of the conventional optical disk recording apparatus;

FIG. 15 is a graph showing the control operation of an eighth embodiment when the equations (1) and (2) are satisfied (a−b=n) and the number of read beams is 5;

FIG. 16 is a graph showing the control operation of a ninth embodiment when the number of read beams is 3 and a−b=2; and FIGS. 17A through 17H are time charts for explaining a read-data obtaining operation and a data linking operation in the reproducing apparatus in FIG. 11.

DETAILED DESCRIPTION OF THE PREFERRED EMBODIMENTS

The present invention will now be described in detail referring to the accompanying drawings.

Figure 3:
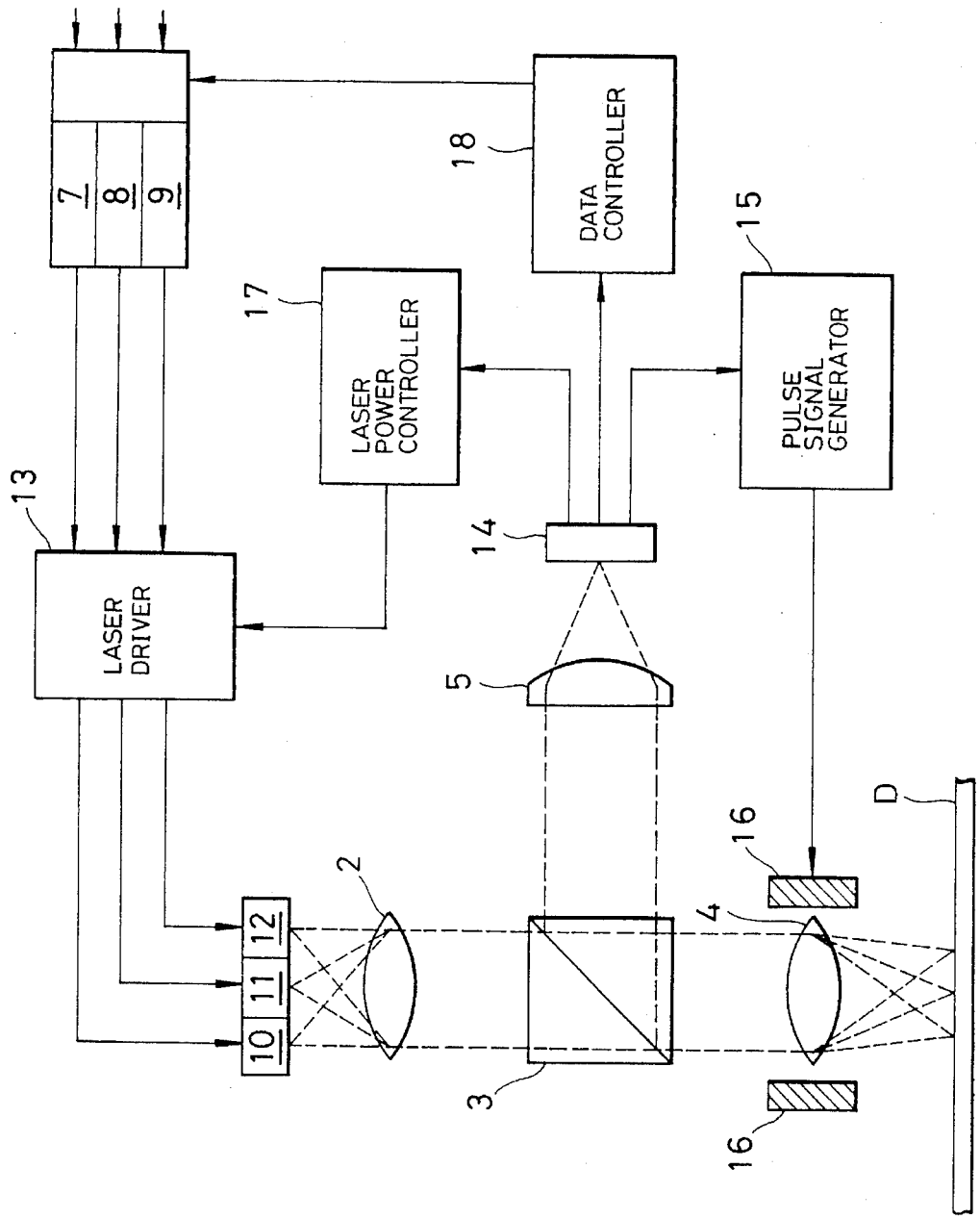
FIG. 3 is a block diagram showing an optical disk recording apparatus according to a first embodiment of the present invention.

FIG. 3 illustrates the structure of an optical disk recording apparatus according to one embodiment of the present invention, and the same reference numerals used in FIG. 1 are also used in FIG. 3 to specify corresponding or identical components.

In FIG. 3, semiconductor lasers 10, 11 and 12, which are light sources, emit laser beams and irradiate the laser beams as light spots on a disk D through a collimator lens 2, a beam splitter 3 and an objective lens 4. The output levels of the individual semiconductor lasers are separately switched by a semiconductor laser driver 13. The driver 13 changes the level of a drive signal to be sent to the laser 10 in accordance with the output data of a memory 7, changes the level of a drive signal to be sent to the laser 11 in accordance with the output data of a memory 8, and changes the level of a drive signal to be sent to the laser 12 in accordance with the output data of a memory 9. The driver 13 also changes the level of each drive signal to a reproduction level or a recording level, or disables the drive signal in accordance with a control signal output from a laser power controller 17 as optical output control means. Each memory has a capacity for storing variable data located from the innermost track to the outermost track, and receives signal data as recorded information from a data producing system (not shown). The writing and reading controls of the individual memories 7 to 9 are separately controlled by a data controller 18. Position detecting means 14, which may comprise a photodetector, detects the position of the objective lens 4 or the position of each light spot on the disk D based on the light of the laser 10 returning from the disk D. The laser power controller 17 and the data controller 18 perform operations as described later, in accordance with the detection output of this position detecting means 14. A pulse signal generator 15 generates a track jump pulse (which will be described later) also in accordance with the detection output of the position detecting means 14. The pulse signal generator 15 serves as jump control means to supply the track jump to an optical head moving section 16, which serves as moving means to move the optical head in the radial direction of the disk D.

Figure 4:
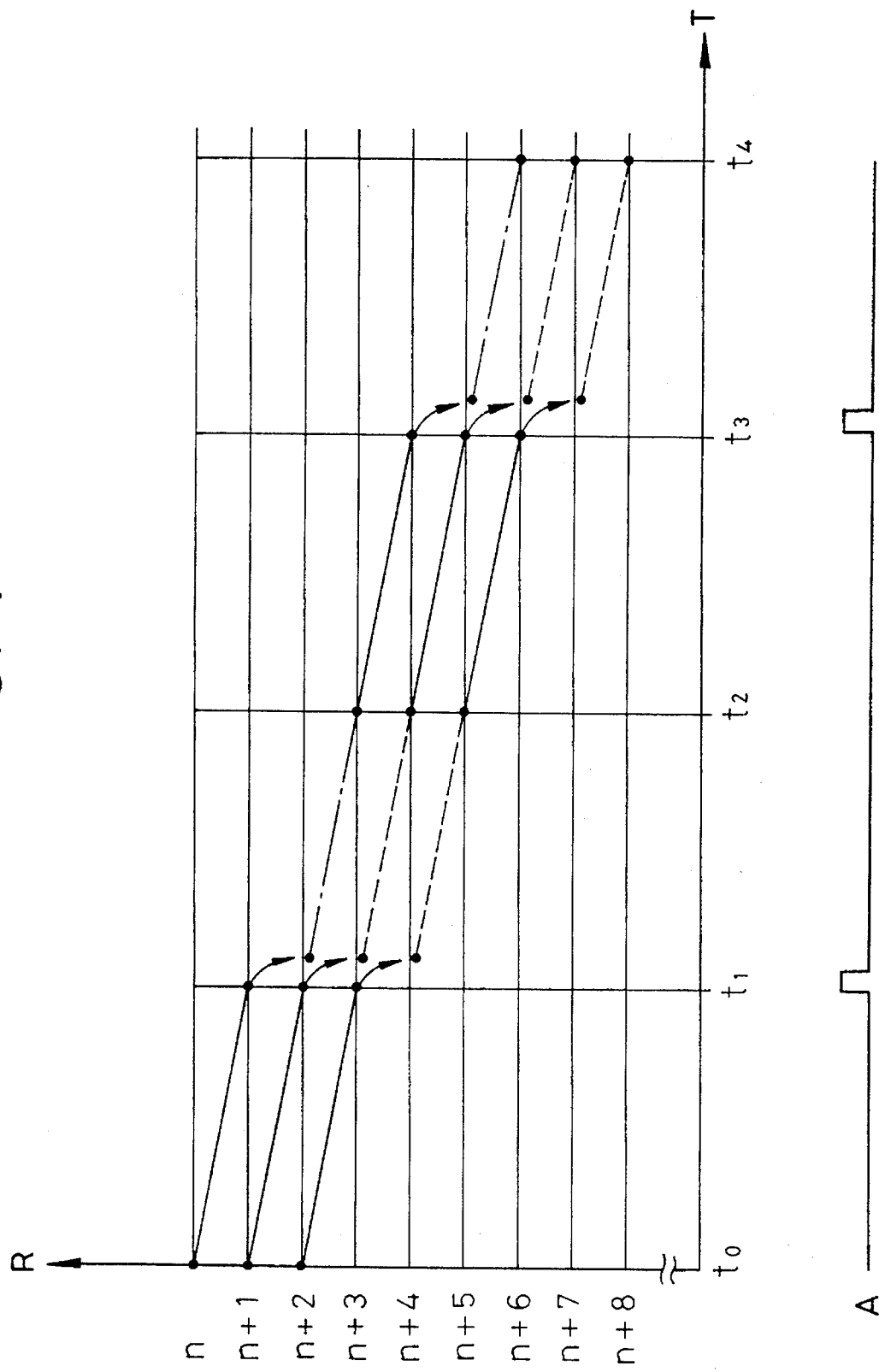
FIG. 4 is a diagram for explaining the operation of the optical disk recording apparatus in FIG. 3.

With reference to FIG. 4, a description will now be given of how information is recorded on a disk by the thus constituted recording apparatus.

In FIG. 4, the vertical axis R indicates the positions of the individual laser spots on the disk in the radial direction by the track numbers (n, n+1, n+2, . . . ) affixed to the recording start points of the individual tracks, while the horizontal axis T indicates the passage of time from the beginning of recording on the track number n with each scale given as the time required for the optical head to trace one track. In this graph, the solid line indicates the tracing of a track by a laser spot in recording mode, the alternate long and short dash line indicates the tracing of a track by a laser spot in reproducing mode, and the broken line indicates the tracing of a track by a laser spot in off mode.

When the individual spots by the semiconductor lasers 10, 11 and 12 respectively lie on the n-th track, (n+1)-th track and (n+2)-th track, one track of data of the n-th track is sent to the memory 7 by the data controller 18. When all the data is sent to the memory 7, the data controller 18 sends one track of data of the (n+1)-th track to the memory 8. Likewise, one track of data of the (n+2)-th track is sent to the memory 9. Upon reception of the drive signals from the semiconductor laser driver 13 according to the data from the memories 7, 8 and 9, the semiconductor lasers 10, 11 and 12 simultaneously start recording from predetermined recording start points, i.e., the recording start points of the n-th track, (n+1)-th track and (n+2)-th track, at time $t_0$. The position detecting means 14 tracks the n-th track with the light from the semiconductor laser 10 returning from the disk D.

When the disk D makes one turn at time $t_1$, the spots by the semiconductor lasers 10 and 11 reach the recording start points of the spots by the semiconductor lasers 11 and 12, i.e., the recording start points of the (n+1)-th track and (n+2)-th track, respectively. At this time, the pulse signal generator 15 sends a pulse signal (pulse signal A as shown in at the bottom of FIG. 4) to the optical head moving section 16 in accordance with the output signal of the position detecting means 14. Then, the optical head moving section 16 jumps the optical head outward by one track in response to this pulse signal. Consequently, the spots by the semiconductor lasers 10, 11 and 12 reach the recording start points of the (n+2)-th track, (n+3)-th track and (n+4)-th track, respectively. At the time the track jump is performed, the detection signal of the position detecting means 14 is sent to the laser power controller 17. The laser power controller 17 then sends a signal to switch the output level of the semiconductor laser 10 to the reproduction power level from the recording power level to the semiconductor laser driver 13, and also sends a signal to turn off the power of the semiconductor lasers 11 and 12 to the driver 13. The position detecting means 14 sends the detection signal to the data controller 18 which controls data to be sent to each memory. The data controller 18 switches the data to be sent to the memory 7 with one track of data of the (n+3)-th track, switches the data to be sent to the memory 8 with one track of data of the (n+4)-th track, and switches the data to be sent to the memory 9 with one track of data of the (n+5)-th track. Then, the (n+2)-th track is tracked for one turn of the disk D with the laser beam from the semiconductor laser 10 having the reproduction power.

When the disk D makes one turn and the laser spot by the semiconductor laser 10 reaches the recording start point of the (n+3)-th track at time $t_2$, the laser power controller 17 switches the powers of the semiconductor lasers 10, 11 and 12 to the recording power in accordance with the output signal of the position detecting means 14. Then, information is recorded on the (n+3)-th track, (n+4)-th track and (n+5)-th track as has been done previously at the time of recording information on the (n+1)-th track and (n+2)-th track.

Repeating this operation (operation from time $t_0$ to time $t_2$), data can sequentially be recorded in a row of pits in a single spiral form from the inner track of the disk. This will shorten the recording time significantly as compared with the prior art.

Figure 5:
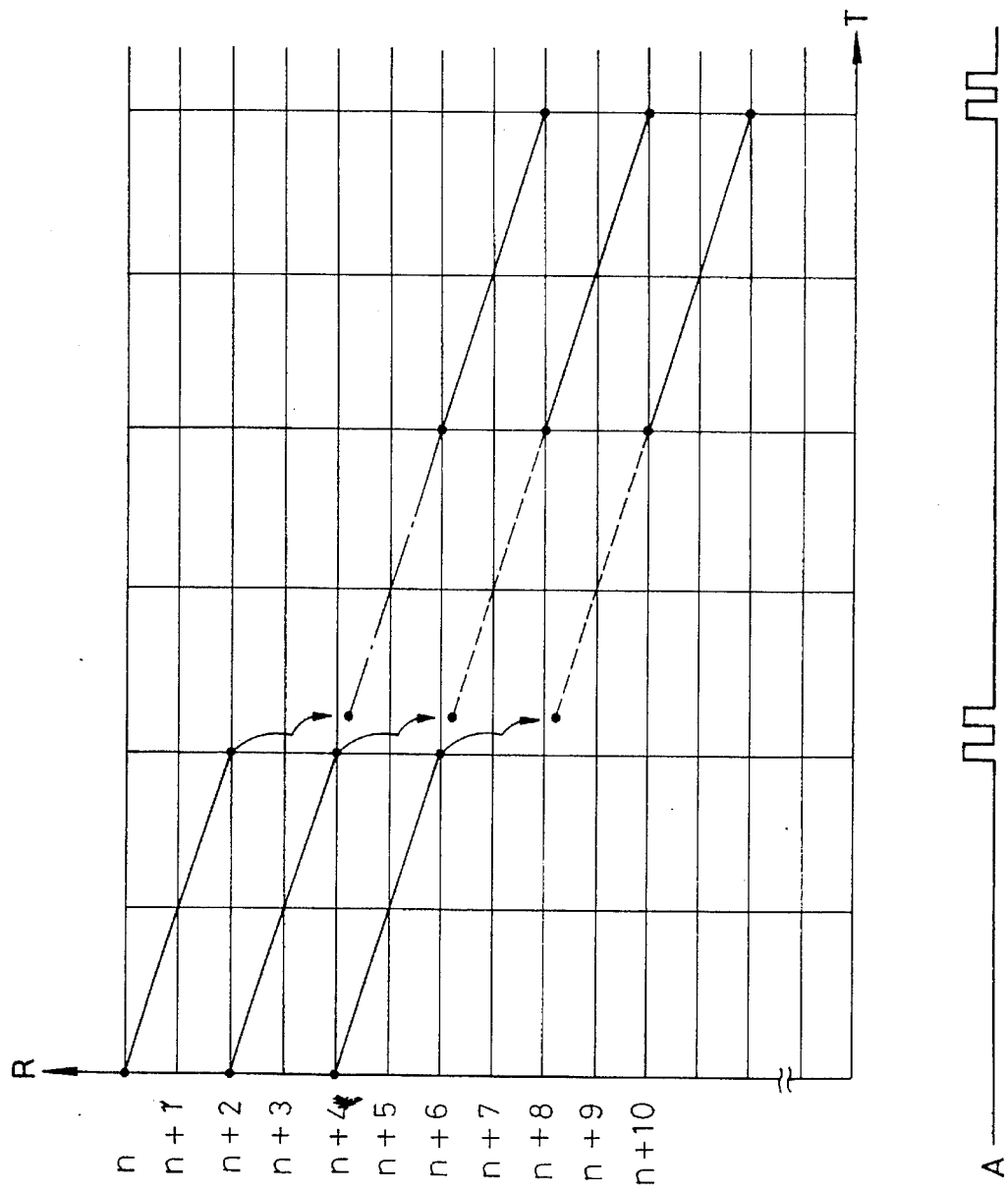
FIG. 5 is a diagram for explaining the operation of an optical disk recording apparatus according to a second embodiment of this invention.
Figure 6:
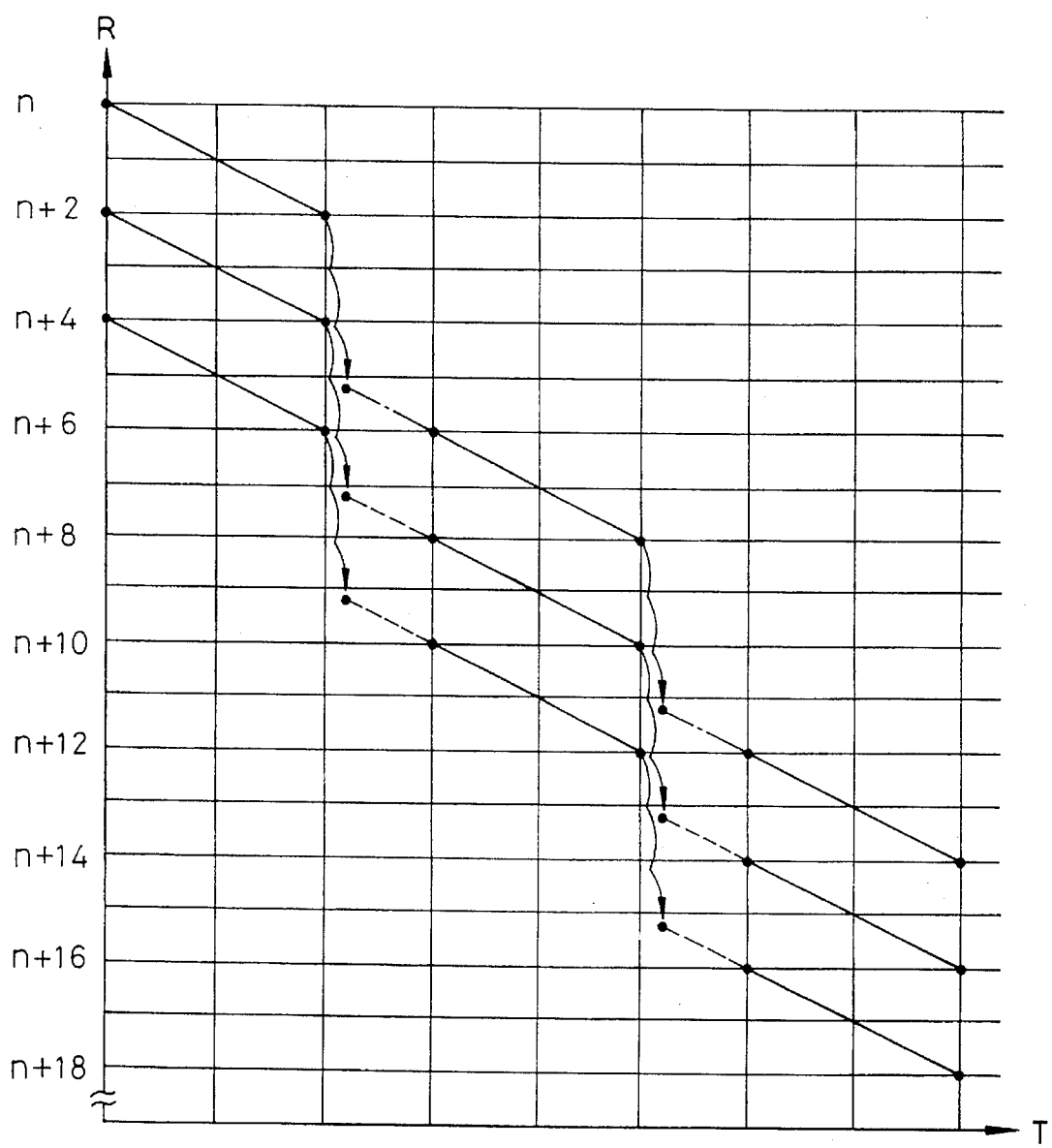
FIG. 6 is a diagram for explaining the operation of an optical disk recording apparatus according to a third embodiment of this invention.

Although the individual laser spots from the respective semiconductor lasers are irradiated on positions at one track pitch therebetween, i.e., at the adjoining track positions, in the above embodiment, they may be irradiated every other track at a pitch of two tracks. In this case, two tracks of data may be sent to each memory and two tracks may be jumped as shown in FIG. 5 (second embodiment) or three tracks may be jumped as shown in FIG. 6 (third embodiment). It is needless to say that the number of the semiconductor lasers may be other than three, and the track pitch may be set equal to or greater than a pitch of three tracks. That is, the track jump has only to be executed every time the disk turns a predetermined number of times.

Figure 7:
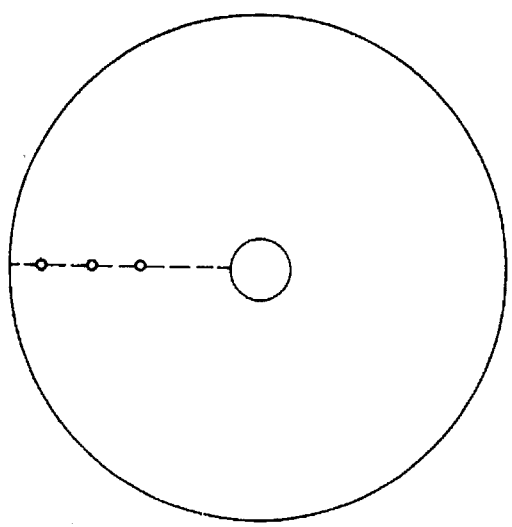
FIG. 7 is a diagram showing the shape of a laser spot in the optical disk recording apparatus in FIG. 3.
Figure 8:
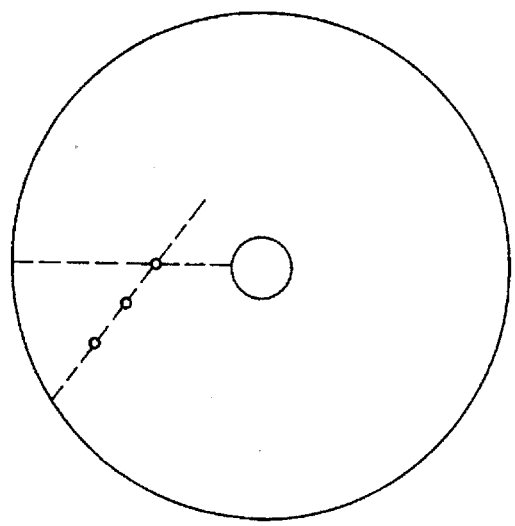
FIG. 8 is a diagram showing the shape of a laser spot in an optical disk recording apparatus according to a fourth embodiment of this invention.

Further, the line connecting the spots formed by the individual lasers is not limited to the one that passes through the center of the disk as shown in FIG. 7, and may not necessarily pass through the center of the disk as shown in FIG. 8 (fourth embodiment).

This invention is not limited to information recording at a constant linear velocity, but is also applicable to information recording at a constant angular velocity. With a constant angular velocity, since data to be recorded on one track is constant, the amount of data to be sent to each memory need not be changed.

Figure 9:
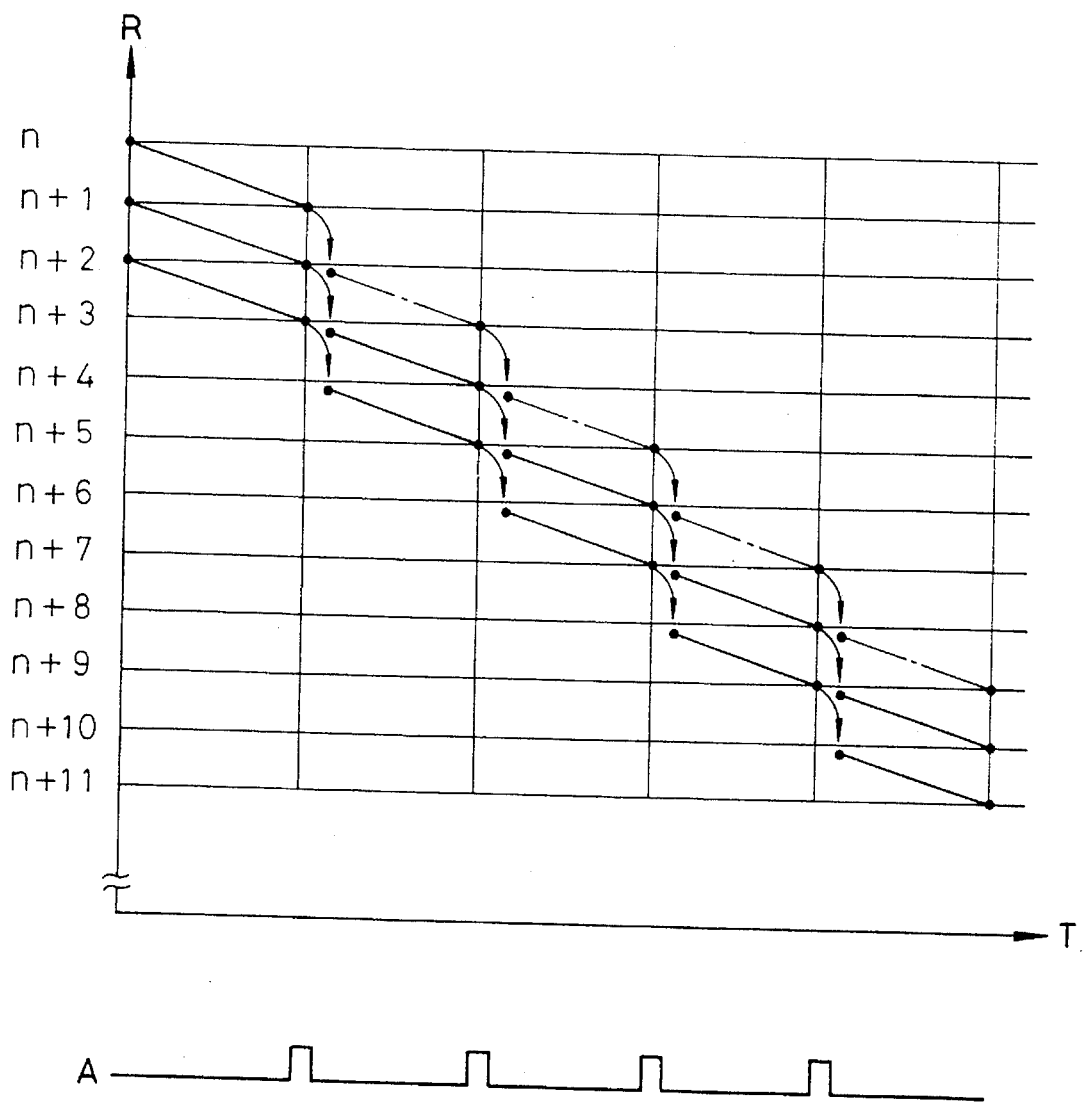
FIG. 9 is a diagram for explaining the operation of an optical disk recording apparatus according to a fifth embodiment of this invention.
Figure 10:
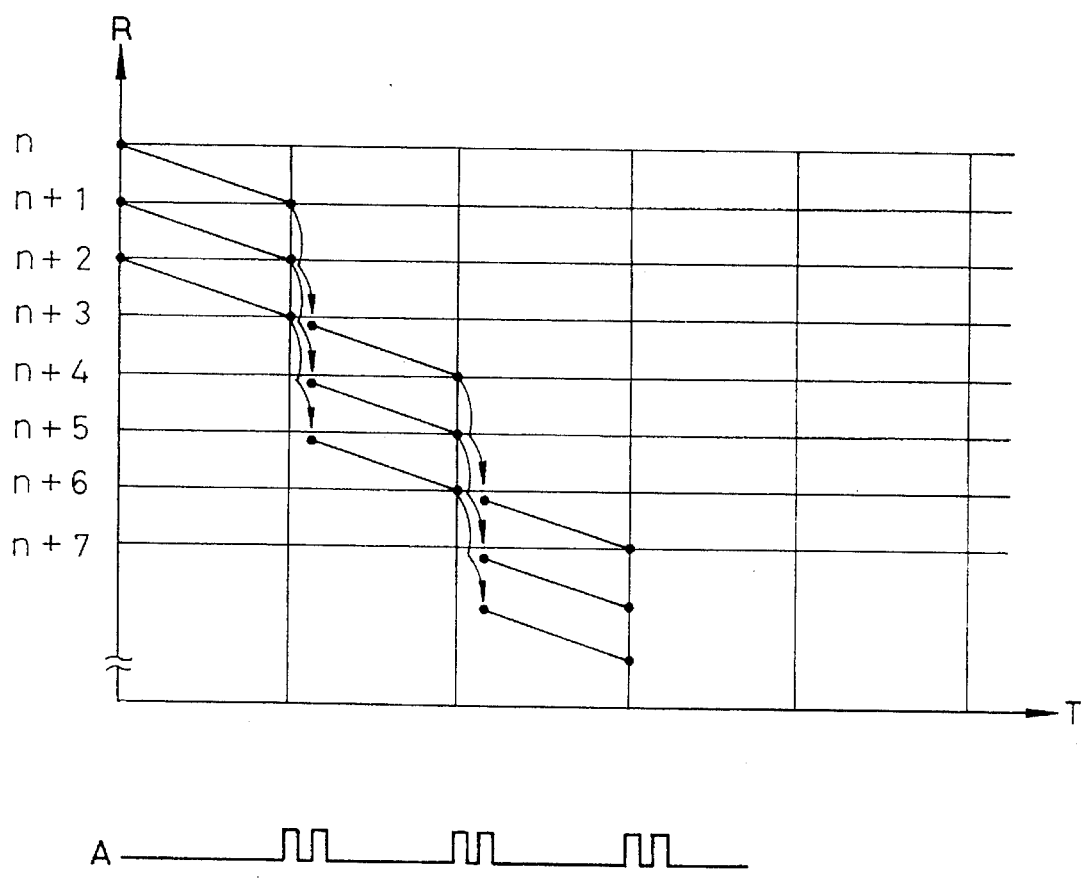
FIG. 10 is a diagram for explaining the operation of an optical disk recording apparatus according to a sixth embodiment of this invention.

Although one laser is set to the reproducing mode and the other laser is set off (off mode) after track jump in the above-described embodiment, information may be recorded without setting the laser off as shown in FIG. 9 (fifth embodiment). Further, the mode can always be set to the recording mode without switching the power of each laser, as shown in FIG. 10.

Seventh Embodiment

In the above-described embodiments, a jump pulse for jumping a track at a predetermined position (e.g., the recording start point of the track; see time $t_1$, time $t_3$ and FIG. 4) is applied to the tracking actuator (moving section 16) of the pickup (optical head) which irradiates a multi-beam to trace a disk with a single spiral track structure. In other words, the track jump position is limited to the same radial directional position on the disk.

Proper modification of the above-described principle would yield an embodiment, which can further reduce the trace-overlapping portion and will thus contribute to further improving the transfer rate.

Figure 11:
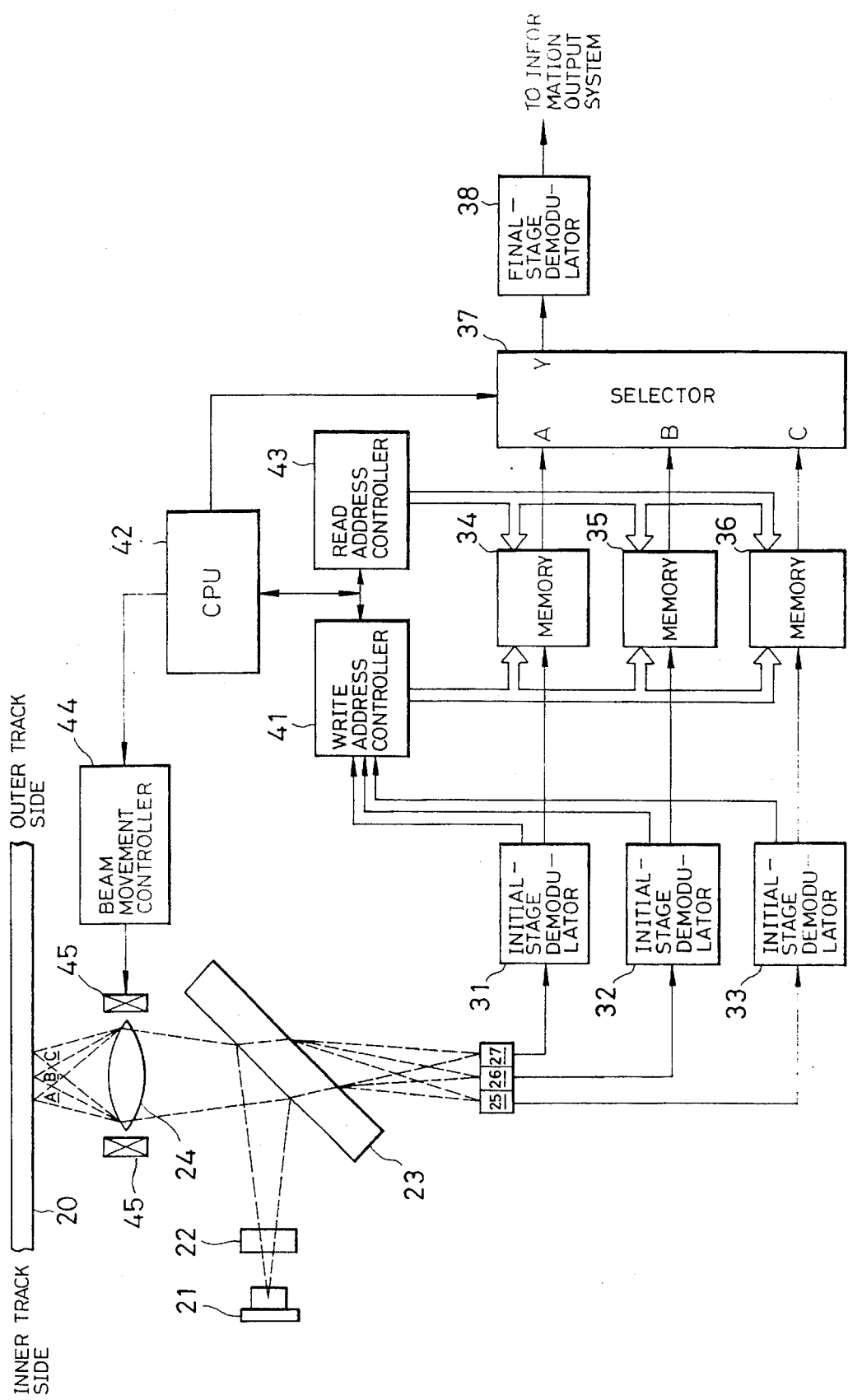
FIG. 11 is a block diagram showing the structure of an optical disk information reproducing apparatus according to a seventh embodiment of this invention which will further improve the transfer rate.

FIG. 11 presents a block diagram showing the structure of an optical disk information reproducing apparatus according to such an embodiment.

In this diagram, a semiconductor laser 21 as a light source generates a reading laser beam for an optical disk 20 on which information has been recorded in a single spiral track format, and guides the laser beam to a diffraction grating 22. The diffraction grating 22 separates the light from the light source 21 to three parts and leads the separated lights to a beam splitter 23. The beam splitter 23 guides the individual separated lights from the diffraction grating 22 to the information recording surface of the disk 20 via an objective lens 24 as read beams A, B and C. The objective lens 24 tightens the three incident lights from the beam splitter 23 to spots as read points on the disk 20 and irradiates the spots on the information recording surface. The individual beam spots or read beams are reflected in accordance with the state of the recording surface of the disk 20, and are guided via the objective lens 24 and the beam splitter 23 to photosensors 25, 26 and 27, respectively. Each photosensor receives the incident light from the beam splitter for each beam spot, and detects the intensity of the received light or the intensity of the reflected light from the disk 20. The detection outputs of the photosensors 25, 26 and 27 are supplied as reflected-light intensity detection signals to respective initial-stage demodulators 31, 32 and 33. Those initial-stage demodulators 31 to 33 perform binary demodulation on the reflected-light intensity detection signals and send the resultant signals as read data to memories 34, 35 and 36, respectively. Each memory has a capacity sufficient for the storage of the read data in a single jump cycle (to be described later). The sent read data is written in each memory and is sent to a selector 37. The selector 37 selectively outputs one piece of the read data read from the memories 34, 35 and 36 to a final-stage demodulator 38 in accordance with a select control signal. The final-stage demodulator 38 sequentially demodulates the read data, selected by the selector 37, so that the resultant data matches with an information output system (not shown).

Each of the initial-stage demodulators detects a signal necessary for linking the read address or data, such as a frame sync signal, as a read-data coupling control signal (or read-data coupling index signal) and sends it to a write address controller 41. The write address controller 41 sends the coupling signals to a CPU 42. Upon reception of the coupling signals, the CPU 42 determines if the read data is effective for data linkage based on the coupling signals. If the decision is affirmative, the CPU 42 sends an instruction signal to the write address controller 41 to set the write addresses of the memories 34, 35 and 36. The read data is sequentially written in each memory at the associated write address set in this manner. The CPU 42 also performs memory reading control in cooperation with a read address controller 43 in parallel to the memory writing control.

When the CPU 42 judges that it is the read timing, the CPU 42 sends an instruction signal to the read address controller 43 to set a read address. In response to the instruction signal, the read address controller 43 sequentially increments or decrements the read address of one of the memories which is to be read. In accordance with that increment or decrement, the CPU 42 sends a select control signal to the selector 37 at the activation timing. Consequently, the selector 37 selects the memory which is undergoing read control.

The CPU 42, which serves as a part of the reproducing control means, generates a track jump pulse and supplies it to a beam movement controller 44 on the basis of the operational principle which will become apparent from the later description. In response to the track jump signal, the beam movement controller 44 supplies a drive signal to a tracking actuator 45 as moving means for moving the light beam in the radial direction of the disk to carry out track jump of the read point through the displacement of the objective lens 24. The circumferential position of at least one of the light beam spots on the disk 20 is detected and given to the CPU 42 by the position detecting means (not shown). As the position detecting means, another circuit may be employed which obtains the detection output by another way, such as the use of a pulse that is synchronized with the rotation of the disk 20. The CPU 42 executes the reproduction control based on such a detection output.

The system for transferring information via the photosensor 25 to the initial-stage demodulator 31 and the memory 34 constitutes the read-information obtaining system for the read beam A, the system for transferring information via the photosensor 26 to the initial-stage demodulator 32 and the memory 35 constitutes the read-information obtaining system for the read beam B, and the system for transferring information via the photosensor 27 to the initial-stage demodulator 33 and the memory 36 constitutes the read-information obtaining system for the read beam C.

A description will now be given of the operation of the above-described optical disk information reproducing apparatus having three read beams.

A single spiral track on the disk 20 is formed so as to extend outward from the inner track side, and the CPU 42 performs a track jump of the read beam in the circumferential direction at a given interval. The interval for the jump operation is expressed by a jump cycle (or jump interval) a which has a value expressed with the time required for one rotation of the disk 20 as a unit (i.e., a value expressed with the rotational cycle of the disk 20 as 1). Further, the time from the beginning of the track jump to the point where the reading of information recorded on the disk and the beam connection in the tracking operation is expressed by a blank period b, which also has a value expressed with the time required for one rotation of the disk 20 as a unit. This period b includes the time needed for operations and processes, such as jumping over a predetermined number of tracks in response to the track jump pulse, stable scanning of a target track, changing the number of rotations in accordance with the target track and obtaining and demodulating a sync signal, and the operations may be unstable in this period. If the correct operation is needed under any circumstance, the maximum value of the necessary time is set.

The value of the period b is determined by the performance of the player or the recording format. According to this embodiment, information is read and reproduced from a single spiral (track type) disk by the multi-beam pickup with the best efficiency by selecting the jump interval a to have the following relationship with the blank period b:

$$a = b + n \tag{1}$$

where n is the spot interval of the read beams having a value expressed with one track pitch as a unit, or $$a-b=n \quad (2)$$

FIGS. 12 through 16 present graphs, which have an elapsed time T since the beginning of the reproduction control taken on the horizontal axis and a radial directional distance R from a predetermined position in a program area on the disk 20 taken on the vertical axis, and which show the trace loci of the individual read beams A, B and C on the disk 20 and the tracing modes by bar-like lines (hereinafter called "bars"). The vertical axis R has track numbers N-m (m: an integer) affixed to the scales (which indicate the track head positions, for example) to indicate the radial positions on the disk 20. Thus, the length between scales is equivalent to the length of one track or the distance the read point travels by one turn of the disk 20. Affixed to the horizontal axis T is the time TU required for the read point to travel one track in order to indicate the length of the elapsed time.

Figure 12:
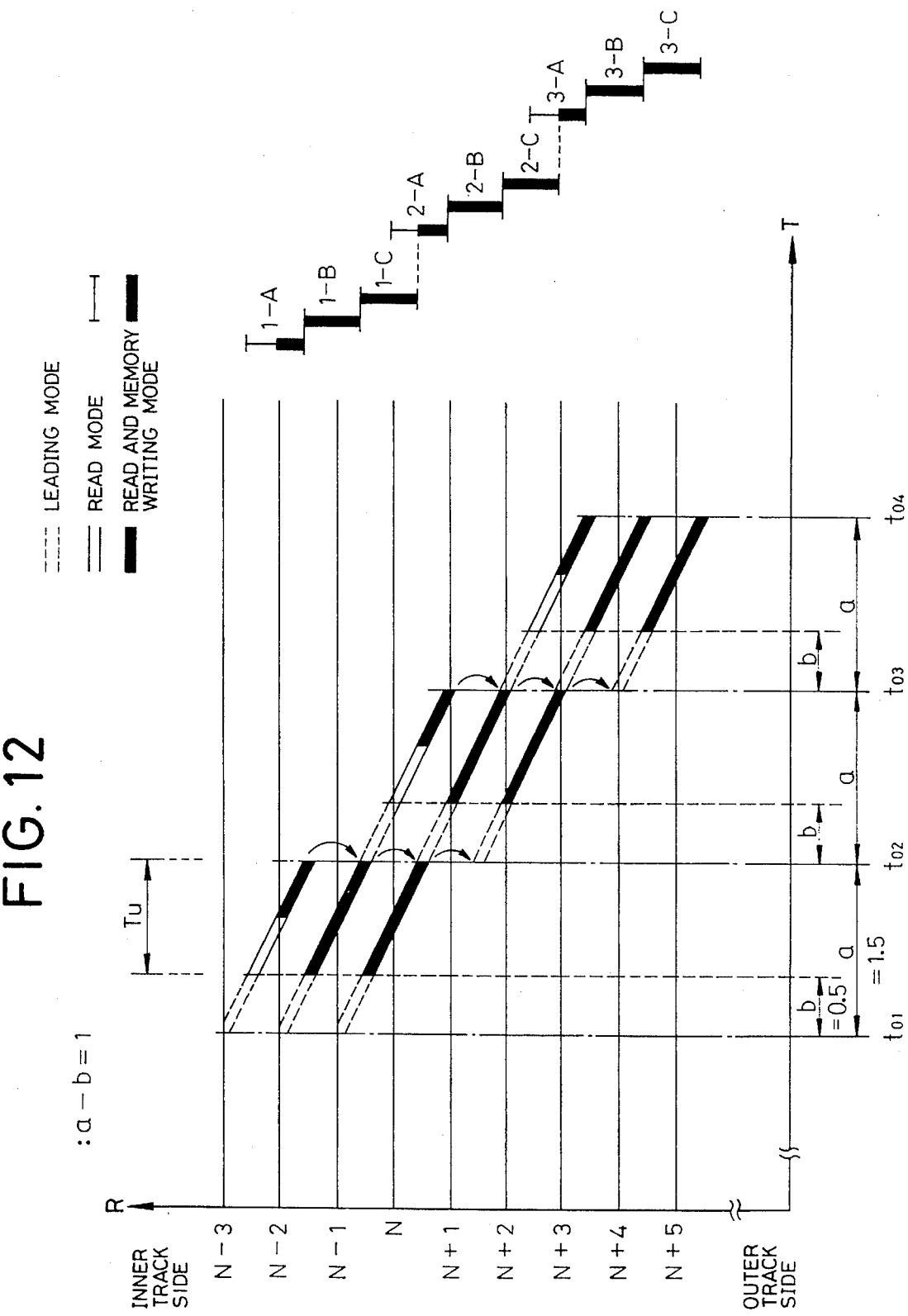
FIG. 12 is a graph showing the control operation of the reproducing apparatus in FIG. 11 when equations (1) and (2) are satisfied (a−b=n)

As illustrated as typical examples in FIG. 12, of those bars, the bar drawn by the broken line represents a zone (leading mode) where signal demodulation is not possible due to the unfixed position of the read beam or no signal synchronization possible, the bar drawn by the solid line represents a zone (read mode) where the pickup reads recorded information but does not write it in the memory 34, 35 or 36, and the bar colored in black represents a zone (read and memory writing mode) where recorded information is read out and is written in the memory 34, 35 or 36. The switching between the modes is accomplished by the CPU 42 and the write address controller 41 based on the structure shown in FIG. 11.

Shown on the right-hand side of the bar graphs are the read statuses of the individual read beams for each jump cycle only in the read mode and the read and memory writing mode.

The operational principle associated with the above-given equations (1) and (2) will be described referring to FIGS. 12 through 14. Those diagrams illustrate only the cases where there are three read beams and a jump over one track is executed in one jump cycle.

According to the structure in FIG. 11, as the spot interval of the read beams is one track pitch, the value of n is 1. FIG. 12 illustrates an example where the values a and b are selected to be a=1.5 and b=0.5 in order to satisfy the condition of a−b=1 in the equation (2).

In this example, from one time $t_{01}$ during reproduction control to the blank period b (=0.5 that is the time needed for a half turn of the disk 20), the leading mode is set to lead each read beam to the associated track. The above-described leading is carried out for the beam A from the head position of the (N−3)-th track to the center portion thereof, for the beam B from the head position of the (N−2)-th track to the center portion thereof, and for the beam C from the head position of the (N−1)-th track to the center portion thereof. Then, the receiving system for the beam A becomes the read mode (reproducing mode) from the center portion of the (N−3)-th track, while the receiving system for the beam B and the receiving system for the beam C become the read and memory writing mode from the center portion of the (N−2)-th track and from the center portion of the (N−3)-th track, respectively. The receiving system for the beam A becomes the read and memory writing mode when the spot of the beam A reaches the (N−2)-th track. It is to be noted that the read mode and read and memory writing mode are both part of the reproducing mode, and the receiving system for the beam A becomes the read and memory writing mode during this reproducing mode merely for connection to the beam C on the track. This reproducing mode is carried out over a time TU required for the read point to travel one track from the end of the leading mode. More specifically, When the jump cycle a (=1.5 that is needed for one and half rotations of the disk) passes from time $t_{01}$, the read and memory writing mode is interrupted. When the jump cycle a passes, the beam A, the beam B and the beam C respectively reach the center positions of the (N−2)-th track, (N−1)-th track, and the N-th track.

When each read and memory writing mode is completed at time $t_{02}$, the CPU 42 generates a track jump pulse to execute one track jump of each beam. As a result, the read points of the individual beams A, B and C move to the center positions of the (N−1)-th track, the N-th track, and the (N+1)-th track, respectively.

Thereafter, the same mode contents and the same mode switching for the mentioned time $t_{01}$ to time $t_{02}$ are repeated.

It is apparent that in this example where the equations (1) and (2) are satisfied, the read and memory writing mode continues without any gap and the period for the read mode where no substantial reading of recorded information occurs is short (only the first half of the period 1-A) as shown on the right-hand side of the bar graph, ensuring no wasteful operation as a whole. That is, the data read in is continuous and the overlapping period to the next trace (read position overlapping period for the beams) is minimized. In FIG. 12, periods 1-A, 1-B and 1-C represent the trace statuses of the three read beams A, B and C from time $t_{01}$ to time $t_{02}$. Likewise, periods 2-A, 2-B and 2-C represent the trace statuses of the three read beams A, B and C from time $t_{02}$ to time $t_{03}$, and periods 3-A, 3-B and 3-C represent the trace statuses of the three read beams A, B and C from time $t_{03}$ to time $t_{04}$.

In this example, with a−b=1, recorded information is read and written in the memory in a period other than the blank period b in the jump cycle a, and a jump is made over one track outward to be ready for the next tracing every time the jump cycle a is passed. It is therefore possible to efficiently read the recorded information and improve the reading speed.

Figure 13:
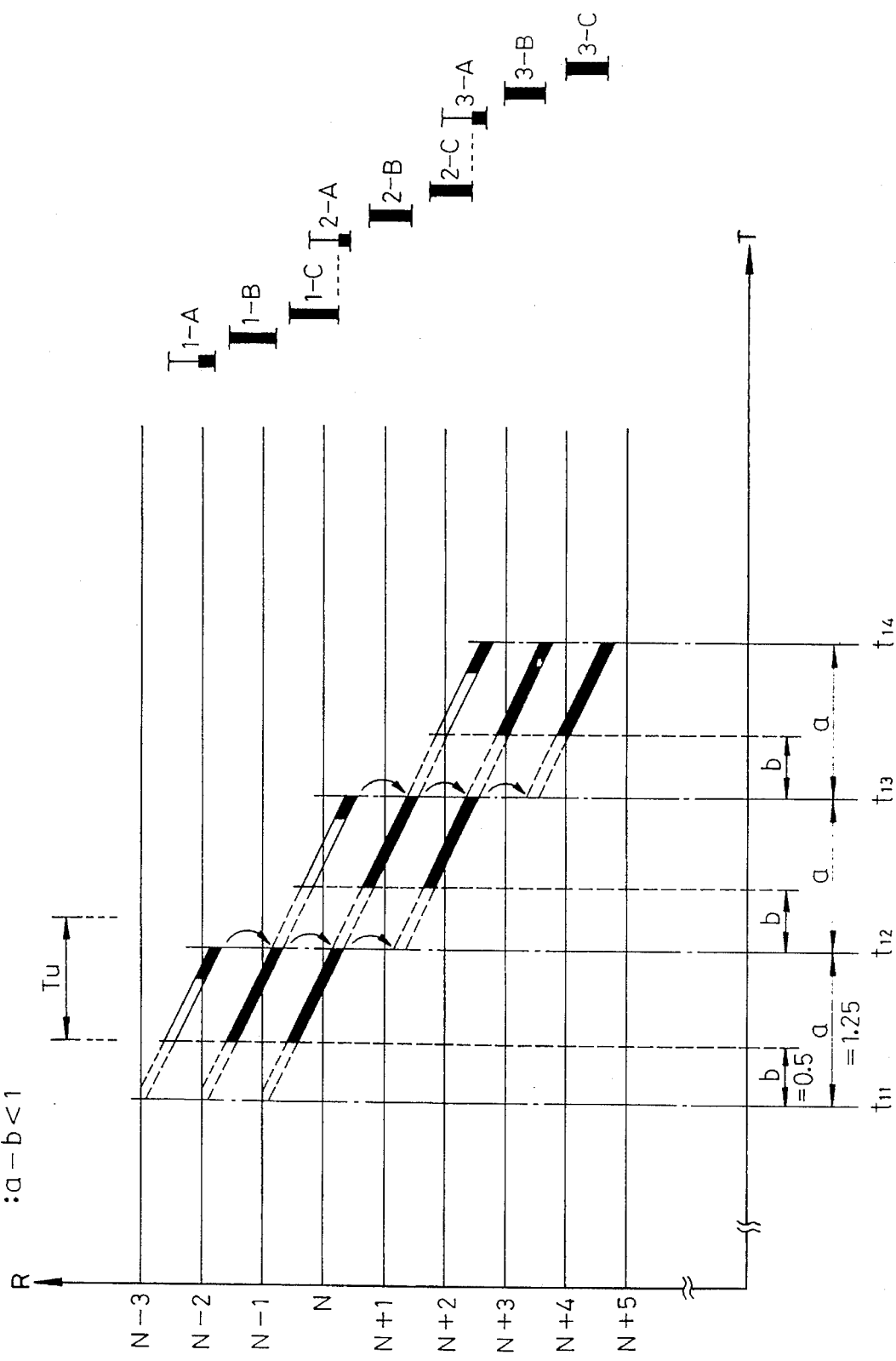
FIG. 13 is a graph showing the control operation of the reproducing apparatus in FIG. 11 when the equations (1) and (2) are not satisfied (a−b<n)

FIG. 13 illustrates an example where a=1.25 and b=0.5, yielding a−b=0.75, which is (a−b<1) and does not satisfy the condition of a−b=1 in the equation (2). Therefore, there is a gap between traces and all the pieces of disk information cannot be read out.

Figure 14:
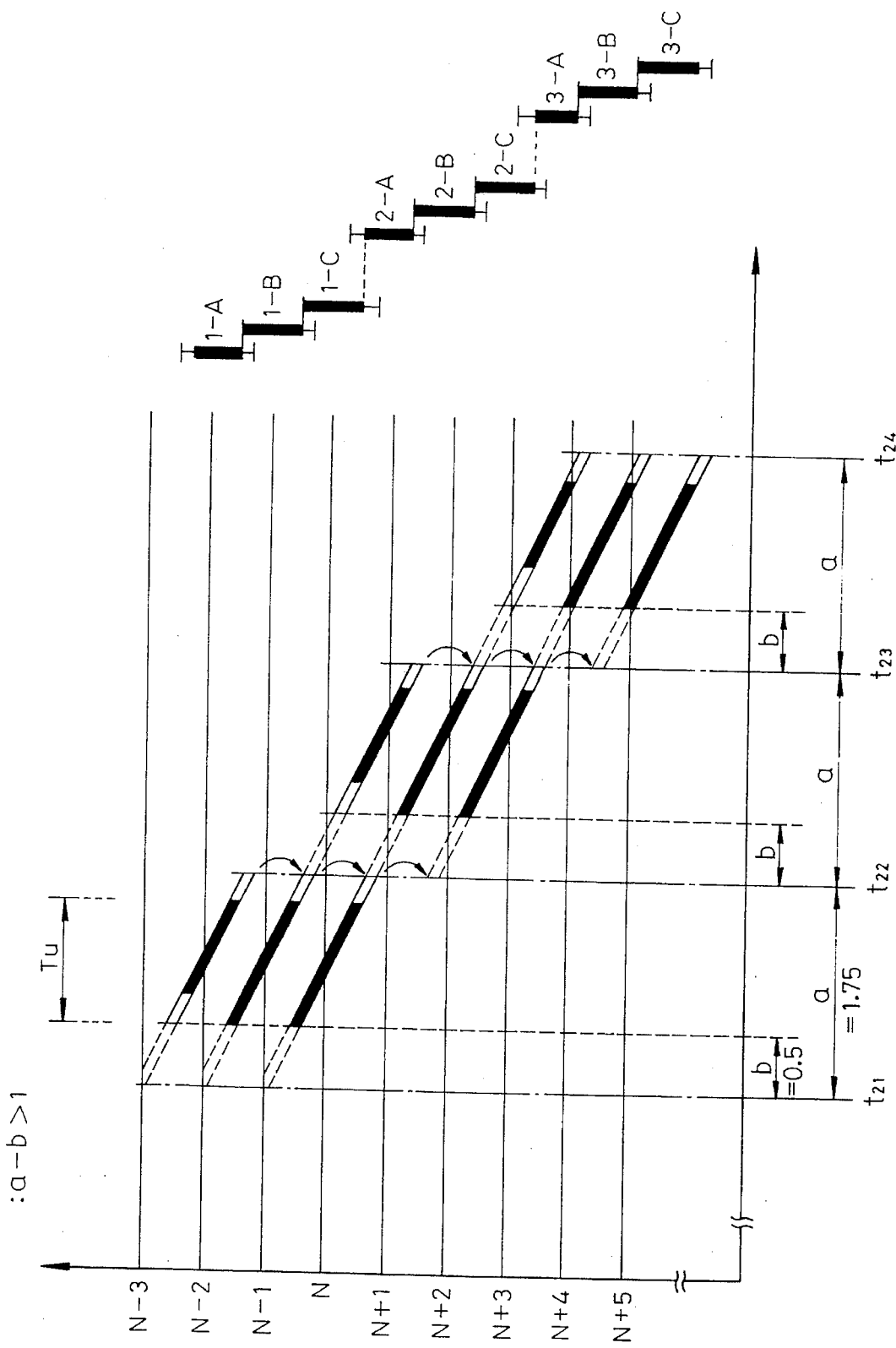
FIG. 14 is a graph showing the control operation of the reproducing apparatus in FIG. 11 when the equations (1) and (2) are not satisfied (a−b>n)

FIG. 14 illustrates an example where a=1.75 and b=0.5, yielding a−b=1.25, which is (a−b>1) and also does not satisfy the condition of a−b=1 in the equation (2). Therefore, the pieces of information read with the individual beams overlap with one another and cannot be read out efficiently.

In short, in the optical disk information reproducing apparatus which performs the operation as shown in FIG. 12, pieces of recorded information are efficiently read out from three tracks with three read beams in the same time, and those pieces of the read data are temporarily stored in the separate memories 34, 35 and 36. The read address controller 43 and selector 37 are driven to link data in such a way that every three tracks of signals correspond to a series of signals on the original single spiral track and are sent to the final-stage demodulator 38 as signals corresponding to the signals on the single spiral track. The final-stage demodulator 38 thus provides an output signal having a high transfer speed.

The above operation is illustrated by the time charts of FIGS. 17A through 17H.

FIG. 17A is a track jump signal which is supplied to the beam movement controller 44 from the CPU 42 and this pulse is output in the cycle a as mentioned above. As read data from the disk 20, signals from the initial-stage demodulators 31, 32 and 33 in the form of FIG. 17B are obtained. Stable read data will not be attained during the blank period b starting from the rising of the jump pulse, and a sync signal is detected thereafter. This sync signal carries data which is to be used as a signal for coupling the read data. After the detection of the sync signal, data A, B or C read out with the read beam is obtained subsequently. The memories 34, 35 and 36 store the data portions (which are to be reproduced) of the demodulated outputs in cooperation with the controller 41 and the CPU 42, as shown in FIG. 17C. The CPU 42 determines effective data to be linked, based on this sync signal, and perform read control together with the read address controller 43 to read the data A from the memory 34 at the rising of the next jump pulse (FIG. 17D), then read the data B from the memory 35 (FIG. 17E) and read the data C from the memory 36 next (FIG. 17F). At the same time as this sequential reading, the selector 37 is controlled to selectively output the data A, B and C in the named order (FIG. 17G), so that data having the data A, B and C linked along the time axis as indicated by FIG. 17H is transferred to the final-stage demodulator 38.

Although three beams are used in the seventh embodiment, this invention is not limited to this type, and the quite the same advantage is obtained if the apparatus is designed so as to jump tracks which are smaller in number than the beams by two in the jump cycle a when n=1. The operation in the case where five beams are used is illustrated in FIG. 15 (eighth embodiment). It is apparent from this diagram that the desired reproduction operation will be accomplished while providing the same advantage as obtained by the system shown in FIG. 12 if three tracks are jumped over in a single jump.

Although the foregoing description of the seventh embodiment has been given with reference to the case where the beam spot interval is set to one track or beams are irradiated on adjacent tracks, this invention is not limited to this particular type, and the value of n can be changed properly in accordance with the beam spot interval in use. The operation in the case where n is 2 is illustrated in FIG. 16 (ninth embodiment). Here, the number of track jumps is obtained from the following equation (3).

$$(\text{number of beam}-1) \times n - 1 \qquad (3)$$

That is, it is apparent that the desired reproduction operation will be accomplished while providing the same advantage as obtained by the system shown in FIG. 12 if three tracks are jumped over in a single jump.

Although the operation explained in the foregoing description of the seventh embodiment takes place at a certain radial position, the blank period b generally differs depending on the radial position of the read point on the disk, and the jump cycle a may be set to different values depending on that radial position or may be set with respect to the maximum value of the blank period b on which the difference originating from the radial position is reflected.

Although the reproducing apparatus for reading data has been explained in the foregoing description of the seventh embodiment, this invention is applicable to the recording apparatus as well as the reproducing apparatus. If the apparatus is designed in such a way that information can be recorded continuously on the track in the blank period b and the recording is conducted in the bar portions colored in black in FIGS. 12 through 16, a sequence of signals can be recorded on a single spiral track using an optical head which emits multi-beams.

Although the number of track jumps in a single jump cycle is set less than the number of beams by two in the foregoing description of the seventh embodiment, this invention is not limited to this particular type when a pickup (optical head) which emits multi-beams is in use, or fast forwarding of an image, repetition of an image, or the like is executed.

In the seventh embodiment too, the line connecting the spots need not pass through the center of the disk as shown in FIG. 8. Further, the individual spots should not necessarily be arranged in a straight line, but may be arranged in different manners as long as the intervals between the spots have a predetermined relationship in the radial direction of the disk. If the beam spots extend in the circumferential direction, the traces for the periods 1-A, 1-B and 1-C shown in FIG. 12 have time lags. However, the time required for the read point to pass the radial directional distance between the spots is too large to be neglected as compared with the time required for the track jump, the time lag components may be included in the blank period b. At this time, the value of the time lag may take a positive value as well as a negative value. That is, in reproducing data outward from the inner track, when the inner beam leads, its distance is set in the positive direction.

Although signals read in parallel are rearranged to correspond to a single spiral track before being output in the above-described embodiments, when reading signals which require no rearrangement like numerical data, the signals may be output in parallel. In recording signals which require no rearrangement in the recording apparatus, it is unnecessary to separate and rearrange a sequence of signals using memories.

The operation in FIG. 4 is for the case where n=1, a=2 and b=1, the operation in FIG. 5 is for the case where n=2, a=4 and b=2, the operation in FIG. 6 is for the case where n=3, a=4 and b=1, and the operations in FIGS. 9 and 10 are for the case where n=1, a=1 and b=almost 0. Thus, the operations in those diagrams are based on the principle of the equations (1) and (2).

In short, according to the seventh to ninth embodiments, t the time a single spiral disk is traced using a multi-beam pickup, no data lack will occur and unnecessary overlapping of traces can be minimized. It is therefore possible to record and reproduce information on and from a disk of a single spiral track type by efficiently using a multi-beam pickup, showing significant advantage to the increase in information transfer rate.

According to the recording apparatus of this invention, as described in detail above, beam spots are simultaneously irradiated on a plurality of different radial positions on a disk at a pitch of a predetermined number of tracks to independently record various information signals, thus ensuring a significant increase in recording speed. Further, at the recording time, the optical head is allowed to jump over a predetermined number of tracks every time the disk makes a predetermined number of turns, so that information recorded on the disk becomes a row of recording pits formed in a single spiral form. The reproduction of data from the thus recorded disk does not require a plurality of read laser spots but will be accomplished by a single laser spot.

Further, according to the optical disk information recording and reproducing apparatus of this invention, beam spots are simultaneously irradiated on a plurality of different radial positions on a disk at a pitch of a predetermined number of tracks to independently record various information signals, and a jump over a predetermined number of tracks is made in a predetermined interval corresponding to a period from the point where each light beam has made a track jump during which period signals are stably reproducible or recordable. It is therefore possible to efficiently improve the transfer rate in information recording and reproduction.

The present invention will therefore provide an optical disk information recording apparatus and reproducing apparatus, which have compatibility with the existing recording apparatus and reproducing apparatus using a single light beam while keeping the disk form with a single spiral track structure.

What is claimed is:

1. An optical disk recording apparatus for recording an information signal in a spiral form on a disk while rotating said disk, comprising:

a memory for storing a plurality of information signals to be recorded;

an optical head for irradiating a plurality of light beams having intensities changeable in accordance with each of said information signals and focusing said light beams as light spots at a plurality of different radial positions on said disk at a pitch of a predetermined number of tracks;

moving means for moving said light spots in a radial direction of said disk;

position detecting means for detecting positions of said light spots on said disk in a circumferential direction of said disk;

jump control means for controlling said moving means in such a way that said light spots make a predetermined number of track jumps for a predetermined number of rotations of said disk in accordance with a detection output of said position detecting means; and optical output control means for controlling output light levels of said light beams, wherein said optical output control means sets each of said output light levels to one of a recording mode level, a reproducing mode level and an off mode level in a cyclic sequence having a period of a predetermined number of rotations of said disk in accordance with said detection output of said position detecting means.

2. The optical disk information recording apparatus according to claim 1, further comprising data control means for changing a bit size of each information signal stored in said memory for every predetermined number of rotations of said disk in accordance with said detection output of said position detecting means.

3. The optical disk information recording apparatus according to claim 1, further comprising a light source for emitting the plurality of light beams to be irradiated by said optical head.

4. An optical disk recording apparatus for recording an information signal in a spiral form on a disk while rotating said disk, comprising:

a memory for storing a plurality of information signals to be recorded;

an optical head for irradiating a plurality of light beams having intensities changeable in accordance with each of said information signals and focusing said light beams as light spots at a plurality of different radial positions on said disk at a pitch of a predetermined number of tracks;

moving means for moving said light spots in a radial direction of said disk;

position detecting means for detecting positions of said light spots on said disk in a circumferential direction of said disk;

jump control means for controlling said moving means in such a way that said light spots make a predetermined number of track jumps for a predetermined number of rotations of said disk in accordance with a detection output of said position detecting means; and optical output control means, responsive to said detection output of said position detecting means, for controlling output light levels of said light beams to one of a recording mode level, a reproducing mode level and an off mode level), wherein said optical output control means temporarily switches at least one of said output light levels to said reproducing mode level every predetermined number of rotations of said disk so as to reproduce at least a portion of a previously recorded track in order to effect continuous recording by said recording apparatus.

5. The optical disk information recording apparatus according to claim 4, further comprising data control means for changing a bit size of each information signal stored in said memory for every predetermined number of rotations of said disk in accordance with said detection output of said position detecting means.

6. The optical disk information recording apparatus according to claim 4, further comprising a light source for emitting the plurality of light beams to be irradiated by said optical head.

* * * * *